United States Patent
Heard et al.

(10) Patent No.: US 10,242,010 B2
(45) Date of Patent: Mar. 26, 2019

(54) METHOD AND APPARATUS FOR MIGRATION OF DATA FROM A SOURCE ENTERPRISE APPLICATION TO A TARGET ENTERPRISE APPLICATION

(71) Applicant: Hyland Software, Inc., Westlake, OH (US)

(72) Inventors: Joseph Eric Heard, Cumming, GA (US); Richard Brightwell, Peachtree Corners, GA (US); Daniel Schmidt, Cumming, GA (US); Jerry Ushakov, Atlanta, GA (US)

(73) Assignee: HYLAND SOFTWARE, INC., Westlake, OH (US)

( * ) Notice: Subject to any disclaimer, the term of this patent is extended or adjusted under 35 U.S.C. 154(b) by 372 days.

(21) Appl. No.: 15/081,347

(22) Filed: Mar. 25, 2016

(65) Prior Publication Data
US 2017/0277698 A1    Sep. 28, 2017

(51) Int. Cl.
*G06F 17/30*    (2006.01)
(52) U.S. Cl.
CPC .. *G06F 17/30079* (2013.01); *G06F 17/30097* (2013.01); *G06F 17/30371* (2013.01)
(58) Field of Classification Search
CPC ................................................ G06F 17/30079
USPC ........................................................ 707/690
See application file for complete search history.

(56) References Cited

U.S. PATENT DOCUMENTS

| | | | | |
|---|---|---|---|---|
| 6,151,608 A * | 11/2000 | Abrams | ................ | G06F 17/303 707/679 |
| 7,653,668 B1 * | 1/2010 | Shelat | ................. | G06F 11/2094 707/610 |
| 7,730,025 B1 * | 6/2010 | Rice | ........................ | G06F 8/51 707/602 |
| 9,430,506 B2 * | 8/2016 | Schuenzel | .............. | G16H 10/60 |
| 2009/0228527 A1 * | 9/2009 | Wang | ..................... | G06F 3/0617 |
| 2009/0240717 A1 * | 9/2009 | Mimatsu | ............. | G06F 11/0727 |
| 2010/0171993 A1 * | 7/2010 | Longobardi | ....... | G06F 17/30011 358/403 |
| 2017/0046143 A1 * | 2/2017 | Kochhar | ................... | G06F 8/60 |

OTHER PUBLICATIONS

NPL1=the Data Conversion Process_ Partnering for Success_ White Box Tech, p. 1-3, Feb. 25, 2016.*

* cited by examiner

*Primary Examiner* — Hicham Skhoun
(74) *Attorney, Agent, or Firm* — Medley, Behrens & Lewis, LLC

(57) ABSTRACT

A method, framework, and computer program product are provided in order to migrate data files associated with a source enterprise application to a target enterprise application. A migration utility framework including processing circuitry may be configured to: generate a migration map to map a plurality of data files from a source enterprise application to a target enterprise application; validate the migration map, where the processing circuitry to validate the migration map includes processing circuitry to determine if target enterprise application requirements are met for both file types of the plurality of data files and metadata of the plurality of data files; generate a hash value of a validated map in response to validating the map, where the hash value represents only the validated map; and migrate the plurality of data files from the source enterprise application to the target enterprise application according to the validated map.

20 Claims, 4 Drawing Sheets

METHOD AND APPARATUS FOR MIGRATION OF DATA FROM A SOURCE ENTERPRISE APPLICATION TO A TARGET ENTERPRISE APPLICATION

TECHNOLOGICAL FIELD

An example embodiment of the present invention relates generally to the migration of data between enterprise applications, and more particularly, to more reliably and efficiently migrating data between enterprise applications using a conversion plan including validated migration maps.

BACKGROUND

Enterprise applications may be used in numerous environments to store various types of data. These enterprise applications may routinely be updated and revised, or replaced with alternative enterprise applications. However, data from an original enterprise application may be needed in the updated, revised, or replacement enterprise application in order to maintain continuity between enterprise applications. Further, most businesses employing enterprise applications cannot afford substantial downtime to accomplish a transition between an original enterprise application and a new enterprise application. Further, it is often imperative that no data is lost in a transition between enterprise applications. When the volume of data files is high, particularly when those data files may have numerous versions and associated metadata, the transition between enterprise applications is complex, time consuming, and error prone.

BRIEF SUMMARY

A method, framework, and computer program product are provided according to an example embodiment in order to migrate data files associated with a source enterprise application to a target enterprise application. Embodiments may include a migration utility framework including processing circuitry configured to: generate a migration map to map a plurality of data files from a source enterprise application to a target enterprise application; validate the migration map, where the processing circuitry to validate the migration map includes processing circuitry to determine if target enterprise application requirements are met for both file types of the plurality of data files and metadata of the plurality of data files; generate a hash value of a validated map in response to validating the map, where the hash value represents only the validated map; and migrate the plurality of data files from the source enterprise application to the target enterprise application according to the validated map.

According to some embodiments, the processing circuitry of the migration utility framework may be configured to: generate a reconciliation report of the plurality of data files migrated from the source enterprise application to the target enterprise application, and confirm that each file of the plurality of data files from the source enterprise application exists in the target enterprise application. The processing circuitry may optionally be configured to: determine if any file in the target enterprise application is duplicated within the target enterprise application; and provide an alert in response to a file in the target enterprise application having a duplicate in the target enterprise application and may optionally present a list of identified duplicate files and the number of duplicate instances of each file.

According to some embodiments, at least one data file of the plurality of data files in the source enterprise application may include two or more versions, where each version of the at least one data file includes metadata and migrating the plurality of data files from the source enterprise application to the target enterprise application includes migrating each of the two or more versions of the at least one data file to the target enterprise application. In response to the processing circuitry determining that metadata of the two or more versions of the at least one data file provide an indication that a version of the at least one data file is missing, the processing circuitry may be configured to generate a replacement version of the at least one data file for the missing version of the at least one data file, where metadata for the missing version may be generated based on the metadata from the two or more versions of the at least one data file.

According to some embodiments, the processing circuitry may optionally be configured to: perform a mock migration of the plurality of data files from the source enterprise application according to the validated map; generate a report of successes and failures of the mock migration; and provide the report for user review. The processing circuitry may optionally be configured to: compare a hash value of a migration map against the hash value of the validated migration map; perform the migration of the plurality of data files of the migration map in response to the hash value of the migration map corresponding to the hash value of the validated map; and provide an alert in response to the hash value of the migration map failing to correspond to the hash value of the validated map.

Embodiments may provide a method including: generating a migration map to map a plurality of data files from a source enterprise application to a target enterprise application; validating the migration map, where validating the migration map includes determining if target enterprise application requirements are met for both file types of the plurality of data files and metadata of the plurality of data files; generating a hash value of a validated map in response to validating the migration map, where the hash value represents only the validated map; and migrating the plurality of data files from the source enterprise application to the target enterprise application according to the validated map. Methods may optionally include: generating a reconciliation report of the plurality of data files migrated from the source enterprise application to the target enterprise application; and confirming that each file of the plurality of data files from the source enterprise application exists in the target enterprise application.

According to some embodiments, methods may optionally include: determining if any file in the target enterprise application is duplicated within the target enterprise application; and providing an alert in response to a file in the target enterprise application having a duplicate in the target enterprise application. At least one data file of the plurality of data files in the source enterprise application may include two or more versions, where each version of the at least one data file includes metadata. Migrating the plurality of data files from the source enterprise application to the target enterprise application may include migrating each of the two or more versions of the at least one data file to the target enterprise application. In response to determining that metadata of the two or more versions of the at least one data file provide an indication that a version fo the at least one data file is missing, methods may include: generating a replacement version of the at least one data file for the missing version of the at least one data file, where metadata for the missing version is generated based on the metadata from the two or more versions of the at least one data file.

According to some embodiments, methods may include: performing a mock migration of the plurality of data files from the source enterprise application according to the validated map; generating a report of successes and failures of the mock migration; and providing the report for review. Methods may include: comparing a hash value of a migration map against the hash value of the validated map; performing the migration of the plurality of data files of the migration map in response to the hash value of the migration map corresponding to the hash value of the validated map; and providing an alert in response to the hash value of the migration map failing to correspond to the hash value of the validated map.

Embodiments described herein provide a computer program product having a non-transitory computer readable storage medium with program code portions stored therein. The program code portions may be configured, upon execution, to: generate a migration map to map a plurality of data files from a source enterprise application to a target enterprise application; validate the migration map, where the program code portions to validate the migration map include program code portions configured to determine if target enterprise application requirements are met for both file types of the plurality of data files and metadata of the plurality of data files; generate a hash value of a validated map in response to validating the migration map, where the hash value represents only the validated map; and migrate the plurality of data files from the source enterprise application to the target enterprise application according to the validated map. The computer program product may include program code portions configured to: generate a reconciliation report of the plurality of data files migrated from the source enterprise application to the target enterprise application; and confirm that each file of the plurality of data files from the source enterprise application exists in the target enterprise application.

According to some embodiments, the computer program code may include program code portions configured to: determine if any file in the target enterprise application is duplicated within the target enterprise application; and provide an alert in response to a file in the target enterprise application having a duplicate in the target enterprise application. At least one data file of the plurality of data files in the source enterprise application may include two or more versions, where each version of the at least one data file includes metadata. The program code instructions configured to migrate the plurality of data files from the source enterprise application to the target enterprise application may include program code instructions to migrate each of the two or more versions of the at least one data file to the target enterprise application. In response to the program code instructions determining that metadata of the two or more versions of the at least one data file provide an indication that a version of the at least one data file is missing, the program code instructions may be configured to generate a replacement version of the at least one data file for the missing version of the data file, where metadata for the missing version may be generated based on the metadata from the two or more versions of the at least one data file.

According to some embodiments, the computer program product may include program code portions configured to: perform a mock migration of the plurality of data file from the source enterprise application according to the validated map; generate a report of successes and failures of the mock migration; and provide the report for user review.

BRIEF DESCRIPTION OF THE DRAWINGS

Figure 1:
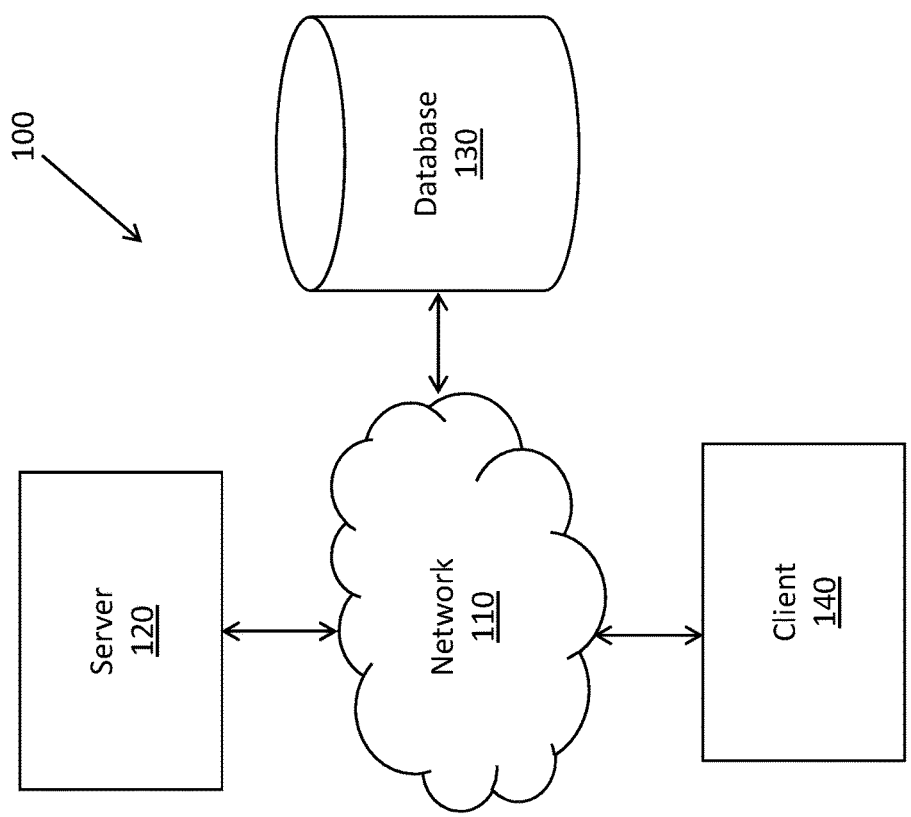
Figure 2:
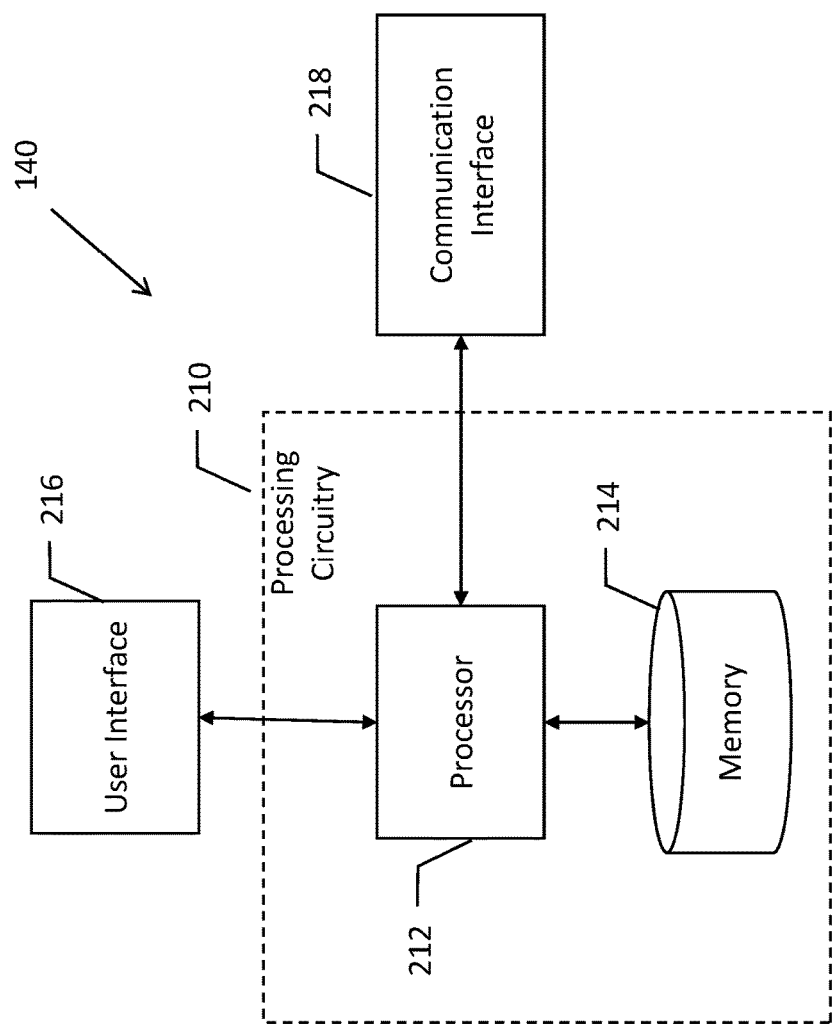
Figure 3:
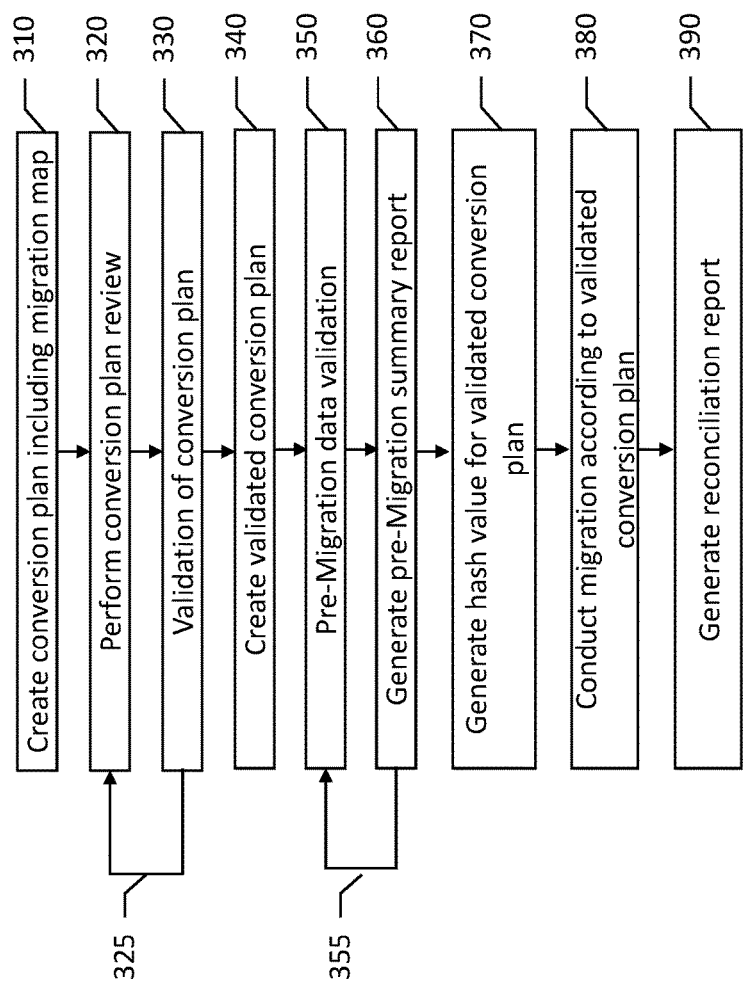
Figure 4:
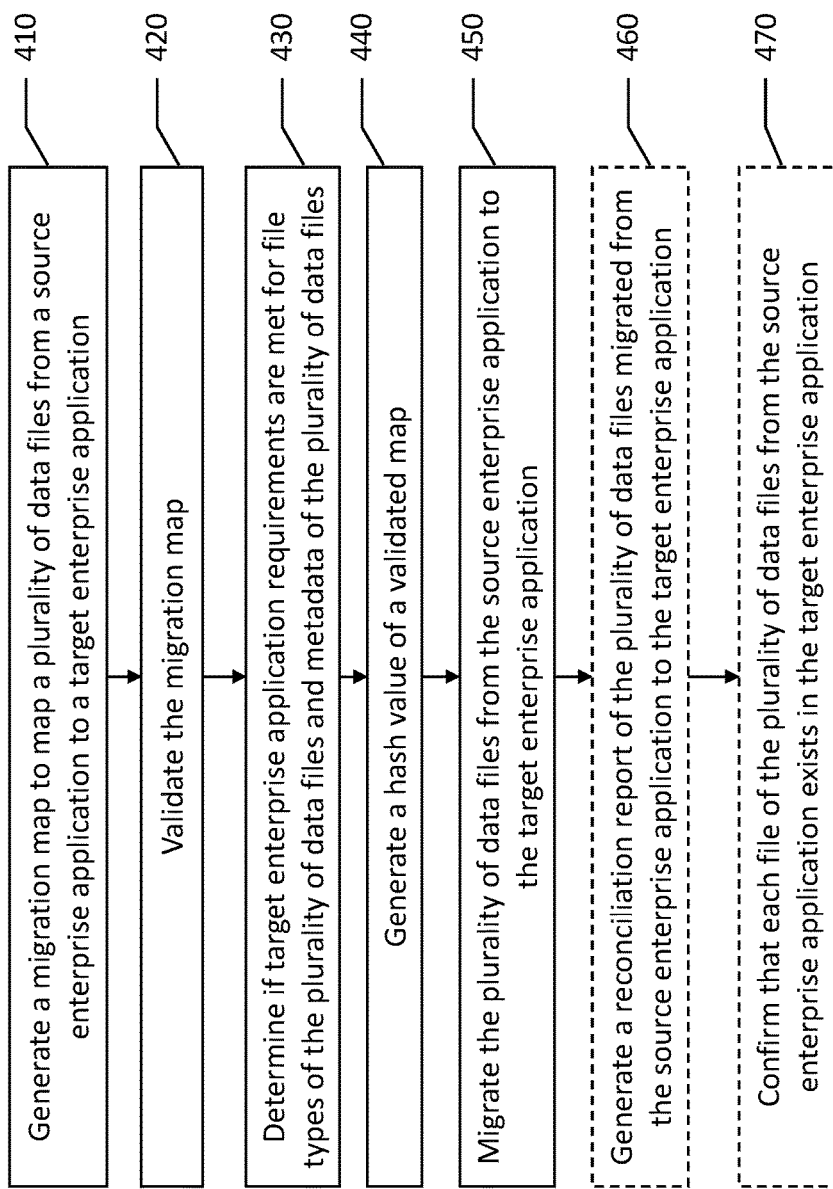

Having thus described certain example embodiments of the invention in general terms, reference will now be made to the accompanying drawings, which are not necessarily drawn to scale, and wherein:

FIG. 1 is a schematic representation of a system for implementing a migration utility in accordance with an example embodiment of the present invention;

FIG. 2 is a block diagram of a computing device that may be specifically configured in accordance with an example embodiment of the present invention;

FIG. 3 is a flowchart illustrating a method of migrating data files from a source enterprise application to a target enterprise application in accordance with an example embodiment of the present invention; and FIG. 4 is a flowchart illustrating a process flow for migrating data files from a source enterprise application to a target enterprise application according to an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, framework, and computer program product are provided in accordance with an example embodiment in order to migrate data files from a source enterprise application to a target enterprise application by establishing a conversion plan, generating a migration map for mapping a plurality of data files from the source enterprise application to the target enterprise application, validating the migration map, and using that validated migration map to perform the migration. Enterprise applications are typically applications used by businesses to manage various activities. Enterprise applications can include financial management or accounting applications, computer-aided-design (CAD) applications, health information management systems, docketing systems, email applications, file-sharing applications, or virtually any application in which data is stored. As businesses develop and as software development progresses, new enterprise applications become available as do revised versions of existing enterprise applications. However, businesses or individuals may be reluctant to change their enterprise applications or upgrade their enterprise applications due to the complexities involved in managing such a change or upgrade, including the potential to lose or damage large amounts of information related to their existing enterprise application. As described herein, embodiments of the present invention provide a reliable and repeatable mechanism to migrate data files from a source enterprise application to a target enterprise application.

Migrating data files from one enterprise application to another involves numerous difficulties and barriers that must be overcome for the successful migration of the data files. Barriers may include the need for specialized development resources to develop software to execute the migration, and the migration process may take a substantial amount of time to complete, when sufficient downtime on many enterprise applications is unavailable or unacceptable. Further, a substantial portion of the time to complete the migration of data files may be spent troubleshooting or triaging lost or improperly transferred data. Implementation resources may lack sufficient expertise to complete the migration successfully due to the specialized nature of many migration projects. Each of these barriers may further dissuade businesses from updating or changing their enterprise applications, which may leave some companies technologically behind the state of the art, including related potential security issues, but may also reduce the likelihood of a customer purchasing and implementing a new enterprise application.

Embodiments of the present invention overcome these difficulties and barriers through a solution that can be implemented without requiring extensive specialized coding, specific database administration experience, or significant training. Example embodiments minimize implementation hours spent executing, troubleshooting, and validating the migration of data files, and minimizes downtime during the migration process. The ease of migration of data in this manner can help overcome a business' reluctance to change or upgrade their enterprise application while also facilitating the marketability of an enterprise application or upgrade thereof.

By way of example, but not of limitation, the method, apparatus and computer program product will be hereinafter described in conjunction with the migration of data files of a source enterprise application to a target enterprise application, without regard to the specific type of data that is migrated. However, examples of data files will be provided herein for reference. Further, while example embodiments are described herein as data files migrated from one enterprise application to another, the enterprise applications themselves may not store the data files, but instead access them from a memory. As such, the migration also includes the migration of data files from a storage device or memory associated with a source enterprise application to a storage device or memory associated with a target enterprise application, where the storage device or memory may be common between the applications. Further, the migration may amount to substantially a translation from a data file compatible with a source enterprise application to a data file compatible with a target enterprise application. Reference herein to a data file of an enterprise application references merely the compatibility of the data file with said enterprise application, and does not necessarily reflect a physical storage location of the data file and the enterprise application.

One example embodiment of the present invention may include the migration of data files from one or more source enterprise applications to a target enterprise application in a healthcare environment. A healthcare system may have an enterprise application to manage billing, insurance, collections, etc., while another enterprise application may handle electronic medical records, radiological studies, laboratory reports, etc. A target enterprise application may be capable of handling and managing the data files from both of these source enterprise applications. In such an embodiment, migration tools as described herein may migrate data files from each source enterprise application to the target enterprise application. Billing records, insurance claims, and collections information may be migrated to a target enterprise application, along with the electronic health records, laboratory reports, and radiological studies, among others. Further, upon migration, the data files may each be associated with a respective patient, such that all information pertaining to a specific patient may be found in a single enterprise application. Some data files may not necessarily be associated with a specific patient, but may be relevant to the target enterprise application, such that these data files may also be migrated according to the conversion plan created and approved by a user as described further below.

FIG. 1 illustrates a system for implementing a migration utility according to an example embodiment of the present invention. It will be appreciated that the system as well as the illustrations in other figures are each provided as example embodiments and should not be construed to narrow the scope or spirit of the disclosure. In this regard, the scope of the disclosure encompasses many potential embodiments in addition to those illustrated and described herein. As such, while FIG. 1 illustrates one example of a configuration of a system, numerous other configurations may also be used to implement embodiments of the present invention.

As shown in FIG. 1, a system in accordance with an example embodiment of the present invention may include a client 140 which may provide a graphical user interface to a user. The client 140 may be embodied as a user terminal such as a laptop computer, workstation, or other like computing device. According to the example embodiment described herein, users, such as employees of a business, for example, may use the client 140 to access information related to the enterprise application. The client 140 may further be employed for implementing the migration utility described herein.

The illustrated system of FIG. 1 may include a server 120 which may be embodied as a server bank, other computer, other computing device, or node configured to provide services as described herein with respect to the illustrated example embodiments. As such, for example, the server 120 may be a platform, such as a dedicated server (or server bank), or the server may be a backend server associated with one or more other functions or services. The source enterprise application and/or the target enterprise application may be embodied by the server 120, for example.

The system of FIG. 1 may further include a network 110 which may be embodied as a local area network (LAN), the Internet, a wide area network (WAN), or any other form of a network, or in any combination thereof, including proprietary private and semi-private networks and public networks. The network 110 may include a wired network, wireless network (e.g., a cellular network, wireless local area network, wireless wide area network, some combination thereof, or the like), or a combination thereof, and in some example embodiments may comprise at least a portion of the Internet. The network 110 may facilitate communication between the client 140, the server 120, and database 130. Further, while the illustrated embodiments depict the server 120, client 140, and database 130 as separate entities, the illustrated entities may be, in part or in all, remotely located communicating via the network, co-located communicating via a network or wired connection, or any combination thereof In some example embodiments, the client 140, server 120, and database 130, may be implemented as a distributed system or a cloud based entity that may be implemented within the network 110. In this regard, the client 140 and server 120 may include one or more servers, server clusters, one or more network nodes, a cloud computing infrastructure, or some combination thereof.

One or both of the client 140 and server 120 may be configured to be in communication with a database 130 over network 110. The database 130 may be embodied as or comprise one or more computing devices configured to store data and provide data upon request to components of the system. In some example embodiments provided herein, the database 130 may store therein the data files to be migrated from one enterprise application to another. The database 130 may be configured to receive data from any apparatus of the system and/or external from the system, such as from a third party system. The database 130 may operate independently from server 120 and/or under different ownership than that of the client 140, but it will be appreciated that in some embodiments, the database 130 may indeed be operated separately but nonetheless by the same entity in control of the server 120.

Although FIG. 1 depicts one database 130, in some embodiments, any number of databases 130 may be present. In some example embodiments provided herein, database 130 may be configured to operate under control of a database management system (DBMS). In some examples, database 130 may be configured to provide data to various servers and/or subsystems of the system.

FIG. 2 illustrates an example of a client 140 (such as client 140 of FIG. 1) according to an example embodiment of the present invention. It should be noted that the components, devices, and elements illustrated in and described with respect to FIG. 2 below may not be required and thus some may be omitted in certain embodiments. Additionally, some embodiments may include further or different components, devices, or elements beyond those illustrated and described with respect to FIG. 2.

According to the embodiment of FIG. 2, the client 140 may include processing circuitry 210 configured to perform actions in accordance with one or more example embodiment disclosed herein. In this regard, the processing circuitry 210 may be configured to perform and/or control performance of one or more functionalities of the client 140 in accordance with various embodiments. The processing circuitry 210 may be configured to perform data processing, application execution, and/or other processing and management services according to one or more example embodiments. In some embodiments, the client 140 may be embodied or comprise a computing device, e.g., an integrated circuit or other circuitry. The circuitry may constitute means for performing one or more operations for providing functionalities described herein.

According to some embodiments, the processing circuitry may include a processor 212 and may further include a memory 214. The processing circuitry 210 may be in communication with or otherwise control a user interface 216, and/or a communication interface 218. As such, the processing circuitry 210 may be embodied as a circuit chip (e.g., an integrated circuit) configured (e.g., with hardware, software, or a combination of hardware and software) to perform the operations described herein.

The processor 212 may be embodied in a number of different ways. According to some embodiments, the processor 212 may include one or more microprocessor, controller, coprocessor, or other computing or processing devices including integrated circuits. Although the illustrated embodiment includes only a single processor 212, examples may be embodied by a plurality of components cooperating to perform the functions of the illustrated processor, such as a plurality of processors embodied on a single device or across multiple devices operating collectively to function as client 140. The processor 212 may be configured to execute instructions stored in the memory 214 or otherwise accessible to the processor 212. Thus, the processor 212, either configured as hardware or a combination of hardware and software, may represent an entity capable of performing operations in accordance with that which is described herein. When the processor 212 is embodied as circuitry, the processor 212 may be specifically configured for conducting these operations. According to another example, the processor 212 may be embodied as an executor of software instructions which may specifically configure the processor 212 to perform one or more operations described herein.

The memory 214 may include one or more non-transitory memory devices such as, for example, volatile and/or non-volatile memory that may be either fixed or removable. The memory 214 may include a non-transitory computer-readable storage medium. While the illustrated embodiment of the memory 214 is depicted as a single memory, it is appreciated that the memory 214 may include a plurality of memory devices collocated or remotely located from one another collectively configured to function as the memory 214 of the client 140. The memory 214 may be configured to store information, data, applications, instructions and/or the like for enabling client 140 to carry out various functions in accordance with one or more example embodiments. According to some embodiments, the memory 214 may be configured to buffer input data for processing by the processor 212, or to store instructions for execution by the processor 212. In some cases, the memory 214 may be in communication with one or more of the processor 212, user interface 216, and/or communication interface 218, for passing information among components of the client 140 and/or the system 100 of FIG. 1.

The user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a joystick, a display, a touch screen display, a microphone, a speaker, and/or other input/output mechanisms. As such, the user interface 216 may, in some example embodiments, provide means for user control of managing or processing data access operations and/or the like.

While the apparatus of FIG. 2 is described herein as the client 140 of system 100, according to some embodiments, the server 120 may be embodied by a substantially similar apparatus. In such embodiments, aspects of the user interface 216 may be limited or the user interface 216 may not be present. Accordingly, regardless of implementation, the user interface 216 may provide input and output means in accordance with one or more example embodiments.

The communications interface 218 may include any mechanism for enabling communication with other devices and/or networks. The communications interface 218 may be, for example, hardware, software, or a combination thereof, that may receive and/or transmit data to and from a network or other device operating in communication with processing circuitry 210. The communication interface 218 may be configured to enable communication among the client 140, the server 120, and/or the database 130 via network 110. Accordingly, the communication interface 218 may, for example, include supporting hardware and/or software for enabling wireless and/or wired communications via cable, digital subscriber line (DSL), universal serial bus (USB), Ethernet, or other methods.

Having now described the system 100 configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or com- binations of the features further described herein. Accordingly, it will be appreciated that some example embodiments may omit one or more of the following features and/or implement variations of one or more of the following features.

Embodiments of the present invention may provide a migration utility framework that supports the migration of data files from a source enterprise application to a target enterprise application. Different enterprise applications may have differing requirements for data files used therewith. For example, document structure, mapping of folder structures, rules for data files, must each be considered when transitioning or migrating data files from a first application to a second application, particularly when the applications may have substantially dissimilar data file management.

Enterprise applications may accumulate millions of data files during their use within an organization and the associated enterprise application may be critical to the functionality of the organization. The data files used by an enterprise application may include numerous permutations of document types or data files, document/data file permissions, document/data file indexing data, document/data file revisions, user data, user permissions, etc. Further, the enterprise application may include large amounts of obsolete documents and data files. The migration of these data files and documents, referred to herein collectively as data files, can be cumbersome and fraught with challenges.

According to example embodiments described herein, a migration utility framework may provide a user interface, such as via user interface 216 of client 140, that presents a clear inventory of data from the source application to the target application, and provides a mapping of the source data to the target data, along with a preview of how the data files will be translated. The mapping may be based on a mapping template, which may include an uncompleted mapping document generated by the system. The mapping template may be populated, in part or in full, based on characteristics of the source enterprise application and the target enterprise application. In an instance in which the target enterprise application is an evolutionary update to the source enterprise application, mapping may be relatively straight forward and more readily determined by the migration tool. In an instance in which the target enterprise application is substantially new relative to the source enterprise application, mapping may require more user intervention to ensure the data files are properly mapped from the source to the target. A mapping template may include valid connection information to both the source enterprise application and the target enterprise application, one or more source documents/data files or document templates (e.g., a grouping of documents that are characterized by the same metadata), and one or more target documents/data files in the target enterprise application. The created mapping template may be a textual form that enables a user to link metadata elements in the source enterprise application to metadata elements in the target enterprise application. The mapping of the source data to the target data may be performed to minimize error and to enable normalization and standardization of historical data transferring between the applications. Suggested mappings may be populated based on industry best practices, which may vary between the industries related to the enterprise applications, and recognized patterns within the data files.

The mapping of source data files of the source enterprise application to the target data files of the target enterprise application may be part of a conversion plan which enables a user to tailor the configuration and mapping of data to accommodate various user requirements. Within a mapping template, a use can choose to map a single source document to a single target document in a one-to-one single mapping translation. Multiple source documents to multiple target documents can also be mapped in bulk mapping. Further, a single metadata template (i.e., a common set of metadata shared by multiple source documents) to multiple target documents may instructed through template based mapping. These conversion options, which allow users to translate and group data by shared data file types, shared indexing data, shared access permissions, or by specific selections, enable the user to choose different bulk conversion options to minimize the need for a configuration in the conversion plan.

Once the conversion plan is defined, including the mapping of source data files to target data files, the migration utility may, for example, using processing circuitry 210, validate the conversion plan along with the source enterprise application and the target enterprise application to check for data type exceptions, missing information, or improper translations. This validation ensures potential issues are caught before any documents or data files are converted between systems. This validation also reduces the need for post migration troubleshooting while also verifying the data is being accounted for and copied appropriately. Validation may be performed by examining the source and target documents or data files on the source and target enterprise applications. A valid mapping will have several characteristics. For example, all document attributes marked required in the source enterprise application will be mapped to a document attribute in the target enterprise application. Further, all document attributes marked required in the target enterprise application will be populated by document attributes in the source enterprise application. Data types linked for source-target document attributes will be compatible. For example, dates will be mapped to dates, numbers to numbers, and strings to strings. A provision may allow a user with sufficient authority to override restrictions in the validation requirements and map any data to a string value in the target enterprise application. In one example, an enterprise application may create an exception and report that the mapping is invalid if the user has mapped an alphanumeric (i.e., string) value in a source document to an integer value in a target document. The system may indicate what specific elements of a conversion plan or mapping therein are invalid to enable a user to review the discrepancies and resolve them as needed.

Upon successful validation of the conversion plan by processing circuitry 210, the migration utility may execute the conversion plan and provide a monitoring tool, such as via user interface 216, for a user to observe the status of the migration. The execution of the conversion plan may not require the moving or transfer of physical files from either the source enterprise application or the target enterprise application as the migration utility may copy and translate the data without affecting the source files, removing the need for downtime of the system and expediting the process. The copied data may also be sequenced in a manner to preserve the version order and revision history of documents and data files, as described further below.

After migration of the source data files of the source enterprise application to target data files of the target enterprise application, the migration utility of example embodiments provided herein may generate a reconciliation report to validate that everything targeted for migration, including document files, data files, indexing data, or user information, has been successfully transferred to the target enterprise application. The reconciliation report may contain a comparison of documents/data files reported as migrated by the migration tool and documents/data files inventoried by the target enterprise application. The migration tool's accounting of transmitted documents/data files may be compiled and updated as the documents and data files are transferred or migrated and the target enterprise application's accounting of migrated documents and data files may be created by inventorying the destination or target enterprise application's data stores. The reconciliation report may be run independently of the migration utility and can account for multiple migration utility executions on the same systems, enabling implementation resources to execute multiple migrations if necessary and to have the traceability of all of the data files and information between the source enterprise application and the target enterprise application.

FIG. 3 illustrates data flow in an implementation of a migration utility of example embodiments described herein. As illustrated at 310, the migration utility creates a conversion plan at 310. The conversion plan is generated based on the source data from the source enterprise application and the data required by the target enterprise application. The conversion plan includes a migration map that identifies how data files from the source enterprise application are to be migrated to the target enterprise application. The conversion plan may be provided to a user for review via user interface 216 of client 140, for example. The conversion plan populates suggested mappings for the migration map which may identify how certain data files are to be migrated to a data file of the target enterprise application. A user may conduct a conversion plan review at 320 to identify any potential issues regarding the migration map, address data conversion issues, modify mappings, create new/additional mappings, remove mappings, and address any issues raised by the conversion plan, such as when data files anticipated by the target enterprise application are not found in the source enterprise application. Once the review is performed at 320, a validation of the conversion plan is conducted by the migration utility at 330 via processing circuitry 210. The validation of the conversion plan includes ensuring that all requirements of the target enterprise application are met through the conversion plan. If any issues are raised through the validation process, such as if certain data file types are incompatible with the migration, the issues raised may be provided back to the user at 320 (via 325) for additional review. The user may review the conversion plan, for example, via user interface 216 of client 140.

Once the conversion plan is validated at 330, a validated conversion plan is created at 340 by processing circuitry 210. This validated conversion plan includes a migration map that accurately depicts the migration of data from the source enterprise application to the target enterprise application. At 350, a pre-migration data validation may be performed, or a "mock migration." This data validation includes ensuring that the data of the source enterprise application is compatible with the migration map and satisfies the data file requirements of the target enterprise application. The data validation may ensure that data files are complete and the metadata associated with data files is complete. The data validation may further perform version management in order to determine the appropriate versions of data files to be migrated, and to generate a version where appropriate, as described further below.

A pre-migration summary report may be generated at 360. This summary report may identify any data compatibility issues and identify any issues that may preclude a complete and accurate migration. The pre-execution summary may be generated from the mock migration to include an inventory of data files that are to be migrated according to the conversion plan. The mock migration retrieves and mock-transmits document and data file metadata for all documents and data files identified in the conversion plan. As this mock migration is performed, the pre-execution summary notes any documents or data files that are untransmittable, for example, if there is missing metadata, or the document itself is missing. Issues may optionally include where metadata is encountered with alpha characters when the target enterprise application expects or requires only numeric metadata for the respective data file type. Various types of data file and metadata issues may be raised during the mock migration, and any issue raised may be documented in the pre-execution summary. This inventory, along with the total number and types of data files that would migrate with the conversion plan are included in the pre-execution summary. If issues exist, a user review may be conducted at 355, via user interface 216, to address any potential issues and conduct another pre-migration data validation at 350.

In response to no issues being raised in the pre-migration summary report, or in response to a user overriding any noted issues, the system may hash the contents of the validated conversion plan and saves the hash code at 370 by processing circuitry 210. The hash value may be generated based on the conversion plan including the migration map and any configuration files to ensure that any migration that is performed includes a hash value indicative of successful validation. If the conversion plan is altered, such as a change in a requirement for metadata associated with one or more files to be migrated, the conversion plan would require re-processing beginning at 310 for validation. Migration using a conversion plan that has been changed since validation may be precluded to avoid data migration issues and failures, which could result in substantial down time. Further, once the conversion plan is executed, the hash code can remain stored with the conversion plan such that the conversion plan could be re-run in the event of a system failure or other stoppage during the execution of the plan.

A migration may be performed according to a validated conversion plan at 380, whereby the data files from the source enterprise application are migrated to the target enterprise application via processing circuitry 210. The migration may be performed on all of the data files from the source enterprise application, or a portion of the data files. A migration using only a portion of the data files from a source enterprise application may be desirable in an instance in which a single migration would take an undesirable amount of time, for example. Once the migration of the data files or a portion of the data files from the source enterprise application to the target enterprise application is complete, a reconciliation report may be generated at 390. This reconciliation report may include, for example, a record of every data file migrated, statistics on the data files migrated, any issues encountered during the migration, etc. This reconciliation report may also serve as an audit record should a review of the migration be desirable. The reconciliation report may be presented to a user via user interface 216 and stored, for example, in memory 214.

The reconciliation report may be generated through software code that is configured to read a table that stores a row for each migrated data file and may communicate with the target enterprise application to confirm that the content for the row is available in the target enterprise application. If any data files identified by rows in the table are missing from the target enterprise application, these missing data files are identified in the reconciliation report. In this manner, the reconciliation report generated by the software code may include a validation of the migration performed. The migration utility may confirm that each data file from the source enterprise application that was included in the conversion plan is properly included on the target enterprise application through a review of the table in view of the data files migrated to the target enterprise application. The migration utility may further review the target enterprise application to determine if any data files are potentially duplicative. The software code for generating the reconciliation report may read all occurrences of the content in the target enterprise application and report on any duplicates. The reconciliation report may provide a list of identified duplicate data files that exist on the target enterprise application and the number of duplicate instances of each file for review by a user. The reconciliation report may provide an indication of any issues found, and confirm when data files have been migrated properly.

Data files that may be migrated from one enterprise application to another may include multiple versions or a revision history. These versions may include prior versions that include data that has since been revised. Migration may require some or all versions of a data file to be migrated in the migration map. In an instance in which more than one version of a data file is required for migration, all versions of the data file will be migrated in a batch during the same migration, and versions will not be broken apart across multiple migrations to ensure versions remain together. Partial migration of a batch may be prevented as during processing, should the migration of part of a batch fail, the entire batch will fail to migrate, and no portion of the batch will be migrated and stored at the target enterprise application.

As data files are migrated, versions of data files may be migrated in an order of ascending or descending versions. For example, a first data file may have four versions: versions 1, 2, 3, and 4. As the versions of this first data file are migrated, the associated metadata for each version of the first data file are migrated and cached. The metadata for migrated versions of the data file may be updated according to a more recent iteration of the metadata being migrated. For example, version 1 and version 2 of the first data file may be successfully migrated with their metadata. Version 3 is migrated and includes updated metadata. The metadata from Version 3 may be used to update the previously migrated versions 1 and 2 of the first data file, without disrupting the process flow of the migration and without having to re-migrate versions 1 and 2 of the first data file.

According to some example embodiments, the migration utility framework may further be configured to generate missing metadata based on other available metadata from related data files. During migration, for example, of a data file having four versions: 1, 2, 3, and 4, the versions of the data file may be migrated in order. In response to the migration utility recognizing that, for example, version 3 of the data file lacks metadata, the migration utility may generate replacement metadata for that version. The metadata may be generated based on the metadata from version 4 of the data file, or a combination of the metadata from version 2 and version 4.

According to example embodiments provided herein, several options for the preservation of documents and document metadata may be provided to a user to accommodate scenarios in which information is incomplete for all detected versions of a document or data file. A "strict" option may reject the transmission of any document or data file version if any preceding or proceeding document or data file version has invalid or missing metadata. A "new" option may transmit document or data file version data for all versions of the document or data file as long as data representing the latest, most recent version of the document or data file is complete and accurate. Document versions missing metadata may then be patched with the metadata from the latest version. If the latest version of the document or data file is missing or has invalid metadata, no versions of the document or data file will be migrated. An "all" option may transmit document or data file version data for all versions of the document or data file that are found in the system regardless of what versions are missing. The requirements for an "all" option may include that at least one version of the document metadata is found among the versions of the document.

In practice, the aforementioned options may be used during processing of source enterprise application data to target enterprise application data. The configuration of the source data extraction query may ensure that all versions of a particular document are extracted and processed at the same time. In response to the migration tool beginning processing of a new document, all versions of the document metadata may be stored in a memory cache. The cache may be emptied and recreated with each new document or data file. When the migration tool determines that it has moved on to a new document or data file, the data in the memory cache may be released for transmission to the target enterprise application, or the data may be purged based on the aforementioned optional configurations. In the "strict" mode, where all versions are accounted for, the cache will be released for transmission. If versions were discovered missing, no documents will be released for transmission. In the "new" mode, the latest version of the document metadata (if present) will be applied to missing versions, and the cache will be released for transmission. If the latest version metadata is not present, no documents will be released for transmission. In an "all" mode, as long as one version is present, the document metadata will be applied to missing versions and the cache will be released for transmission.

Embodiments of the present invention may be illustrated through a flowchart such as the flowchart of FIG. 4, which depicts a more concise flow of the operations performed by a migration utility framework. As shown at 410, a migration map is generated to map a plurality of data files from a source enterprise application to a target enterprise application. This may be performed, for example, using processing circuitry 210 of client 140. The migration map is validated at 420, and the validation includes determining if the target enterprise application requirements are met for the file types of the plurality of data files and the metadata of the plurality of data files illustrated at 430. Upon validation, a hash value of the validated map is generated at 440. Using the validated map, the plurality of data files are migrated from the source enterprise application to the target enterprise application.

The flowchart of FIG. 4 further depicts optional operations illustrated in dashed lines, where a reconciliation report of the plurality of data files migrated from the source enterprise application to the target enterprise application is generated at 460. At 470, a confirmation is made that each file of the plurality of data files from the source enterprise application exists in the target enterprise application.

As described above, FIGS. 4 and 5 illustrate flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more storage device, such as memory 214 of a client 140 and executed by processing circuitry 210 in the client. In some embodiments, the computer program instructions comprising the computer program product(s) which embody the procedures described above may be stored by memory devices of a plurality of computing devices.

As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor 212 may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A migration utility framework comprising processing circuitry configured to:
   generate a migration map to map a plurality of data files from a source enterprise application to a target enterprise application, wherein at least one data file of the plurality of data files in the source enterprise application includes two or more versions, wherein each version of the at least one data file comprises metadata;
   validate the migration map, wherein the processing circuitry configured to validate the migration map comprises processing circuitry configured to:
      determine if target enterprise application requirements are met for file types of the plurality of data files and metadata of the plurality of data files;
   generate a hash value of a validated map in response to validating the migration map, wherein the hash value represents only the validated map; and
   migrate the plurality of data files from the source enterprise application to the target enterprise application according to the validated map, wherein migrating the plurality of data files from the source enterprise application to the target enterprise application comprises migrating each of the two or more versions of the at least one data file to the target enterprise application, wherein in response to the processing circuitry determining that metadata of the two or more versions of the at least one data file provides an indication that a version of the at least one data file is missing, the processing circuitry is configured to:
      generate a replacement version of the at least one data file for the missing version of the at least one data file, wherein metadata for the missing version is generated based on the metadata from the two or more versions of the at least one data file.

2. The migration utility framework of claim 1, wherein the processing circuitry is further configured to:
   generate a reconciliation report of the plurality of data files migrated from the source enterprise application to the target enterprise application; and
   confirm that each file of the plurality of data files from the source enterprise application exists in the target enterprise application.

3. The migration utility framework of claim 2, wherein the processing circuitry is further configured to:
   determine if any file in the target enterprise application is duplicated within the target enterprise application; and
   provide an alert in response to a file in the target enterprise application having a duplicate in the target enterprise application.

4. The migration utility framework of claim 1, wherein the processing circuitry is further configured to:
   compare a hash value of a migration map against the hash value of the validated map;

perform the migration of the plurality of data files of the migration map in response to the hash value of the migration map corresponding to the hash value of the validated map; and provide an alert in response to the hash value of the migration map failing to correspond to the hash value of the validated map.

5. The migration utility framework of claim 1, wherein the processing circuitry is further configured to check for data type exceptions between the source enterprise application and the target enterprise application.

6. The migration utility framework of claim 1, wherein the migration map is generated based upon a mapping template, where the mapping template enables a client computing device to link metadata elements from the source enterprise application to metadata elements in the target enterprise application.

7. The migration utility framework of claim 1, wherein the processing circuitry is further configured to:

perform a mock migration of the plurality of data files from the source enterprise application according to the validated map;

generate a report of successes and failures of the mock migration; and provide the report for user review.

8. A method comprising:

generating a migration map to map a plurality of data files from a source enterprise application to a target enterprise application, wherein at least one data file of the plurality of data files in the source enterprise application includes two or more versions, wherein each version of the at least one data file comprises metadata;

validating the migration map, wherein validating the migration map comprises:

determining if target enterprise application requirements are met for file types of the plurality of data files and metadata of the plurality of data files;

generating a hash value of a validated map in response to validating the migration map, wherein the hash value represents only the validated map;

migrating the plurality of data files from the source enterprise application to the target enterprise application according to the validated map, wherein migrating the plurality of data files from the source enterprise application to the target enterprise application comprises migrating each of the two or more versions of the at least one data file to the target enterprise application; and in response to determining that metadata of the two or more versions of the at least one data file provides an indication that a version of the at least one data file is missing, generating a replacement version of the at least one data file for the missing version of the at least one data file, wherein metadata for the missing version is generated based on the metadata from the two or more versions of the at least one data file.

9. The method of claim 8, further comprising:

generating a reconciliation report of the plurality of data files migrated from the source enterprise application to the target enterprise application; and confirming that each file of the plurality of data files from the source enterprise application exists in the target enterprise application.

10. The method of claim 9, further comprising:

determining if any file in the target enterprise application is duplicated within the target enterprise application; and providing an alert in response to a file in the target enterprise application having a duplicate in the target enterprise application.

11. The method of claim 8, further comprising:

performing a mock migration of the plurality of data files from the source enterprise application according to the validated map;

generating a report of successes and failures of the mock migration; and providing the report for user review.

12. The method of claim 8, further comprising:

comparing a hash value of a migration map against the hash value of the validated map;

performing the migration of the plurality of data files of the migration map in response to the hash value of the migration map corresponding to the hash value of the validated map; and providing an alert in response to the hash value of the migration map failing to correspond to the hash value of the validated map.

13. The method of claim 8 further comprising:

checking for data type exceptions between the source enterprise application and the target enterprise application.

14. The method of claim 8, wherein the migration map is generated based upon a mapping template, where the mapping template enables a client computing device to link metadata elements from the source enterprise application to metadata elements in the target enterprise application.

15. A computer program product comprising a non-transitory computer readable storage medium having program code portions stored therein, the program code portions configured, upon execution, to:

generate a migration map to map a plurality of data files from a source enterprise application to a target enterprise application, wherein at least one data file of the plurality of data files in the source enterprise application includes two or more versions, wherein each version of the at least one data file comprises metadata;

validate the migration map, wherein the program code portions to validate the migration map comprise program code portions configured to:

determine if target enterprise application requirements are met for file types of the plurality of data files and metadata of the plurality of data files;

generate a hash value of a validated map in response to validating the migration map, wherein the hash value represents only the validated map; and migrate the plurality of data files from the source enterprise application to the target enterprise application according to the validated map, wherein the program code instructions configured to migrate the plurality of data files from the source enterprise application to the target enterprise application are configured to migrate each of the two or more versions of the at least one data file to the target enterprise application, wherein in response to the program code portions determining that metadata of the two or more versions of the at least one data file provides an indication that a version of the at least one data file is missing;

the computer program product further comprising program code instructions configured to:

generate a replacement version of the at least one data file for the missing version of the at least one data file, wherein metadata for the missing version is generated based on the metadata from the two or more versions of the at least one data file.

16. The computer program product of claim 15, further comprising program code portions configured to:
    generate a reconciliation report of the plurality of data files migrated from the source enterprise application to the target enterprise application; and
    confirm that each file of the plurality of data files from the source enterprise application exists in the target enterprise application.

17. The computer program product of claim 16, further comprising program code portions configured to:
    determine if any file in the target enterprise application is duplicated within the target enterprise application; and
    provide an alert in response to a file in the target enterprise application having a duplicate in the target enterprise application.

18. The computer program product of claim 15, further comprising program code portions configured to:
    perform a mock migration of the plurality of data files from the source enterprise application according to the validated map;
    generate a report of successes and failures of the mock migration; and
    provide the report for user review.

19. The computer program product of claim of claim 15, further comprising program code portions configured to:
    compare a hash value of a migration map against the hash value of the validated map;
    perform the migration of the plurality of data files of the migration map in response to the hash value of the migration map corresponding to the hash value of the validated map; and
    provide an alert in response to the hash value of the migration map failing to correspond to the hash value of the validated map.

20. The computer program product of claim of claim 15, wherein the program code instructions are further configured to:
    check for data type exceptions between the source enterprise application and the target enterprise application.

* * * * *